June 20, 1961
G. SCHULTZ
2,988,826
GUIDE FOR HANDWRITING ANALYSIS
Filed Jan. 15, 1958
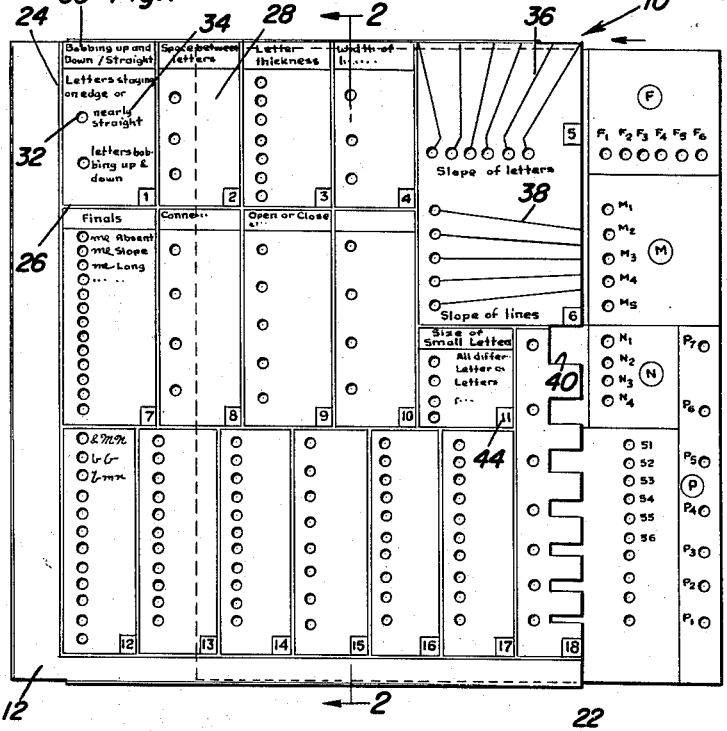
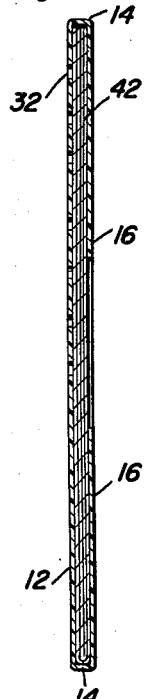
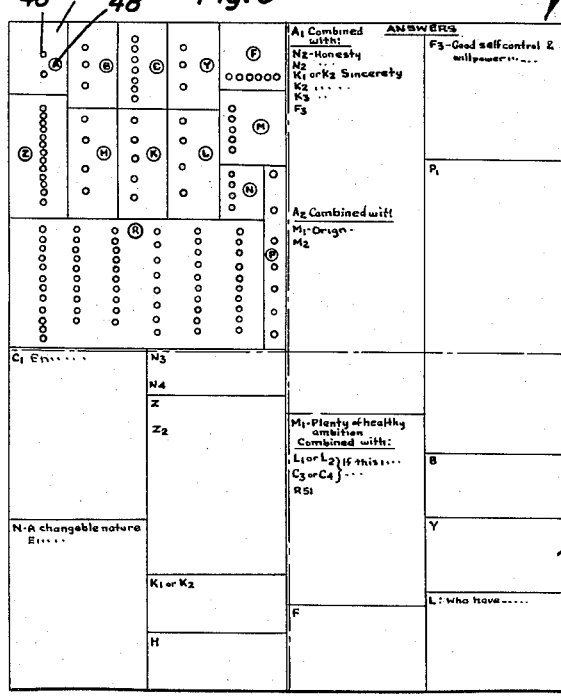
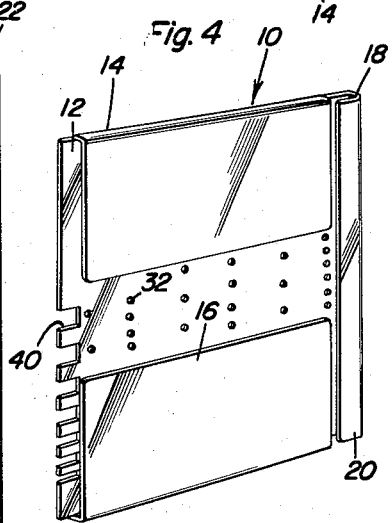
Guillermo Schultz
INVENTOR.

United States Patent Office 2,988,826
Patented June 20, 1961

2,988,826
GUIDE FOR HANDWRITING ANALYSIS
Guillermo Schultz, P.O. Box 183, New York 32, N.Y.
Filed Jan. 15, 1958, Ser. No. 709,043
3 Claims. (Cl. 35—36)

The present invention generally relates to a device for aiding in analyzing handwriting and may be employed as a game device or as an educational device in that persons normally unskilled in analyzing handwriting may analyze any sample of handwriting for determining the attributes and other information concerning the person that provided the handwriting sample.

The present invention incorporates in its construction a guide device generally in the form of a hollow housing for slidably receiving a folded sheet of paper which may be termed an answer or analysis sheet, the guide having different categories for judging the handwriting sample and an instrument such as a pencil being employed for marking the rating of the sample of handwriting in each category onto the answer sheet whereby the ratings may be employed with printed material on the answer sheet for determining the characteristics of the person that supplies the handwriting sample.

Another important feature of the present invention is to provide a guide for handwriting analysis which is extremely simple in construction, easy to use, well adapted for its intended purposes and relatively inexpensive to manufacture.

These together with other objects and advantages which will become subsequently apparent reside in the details of construction and operation as more fully hereinafter described and claimed, reference being had to the accompanying drawing forming a part hereof wherein like numerals refer to like parts throughout, and in which:

FIGURE 1 is a plan view of the handwriting analysis guide of the present invention with the answer sheet shown being inserted therein;

FIGURE 2 is a transverse sectional view taken substantially upon a plane passing along section line 2—2 of FIGURE 1 illustrating the relationship of the guide to the answer sheet;

FIGURE 3 is a plan view of the answer sheet with the printed material shown schematically;

FIGURE 4 is a perspective view showing the rear of the handwriting guide.

Referring now specifically to the drawings, the numeral 10 generally designates the guide for handwriting analysis of the present invention which includes a generally square or rectangular panel 12 having top and bottom edges extending rearwardly as designated by the numeral 14, the edges 14 being provided with inturned rear panels 16 which terminate in spaced aligned relation to each other and are in spaced parallel relation to the front panel 12. One side edge of the front panel 12 extends rearwardly as indicated by the numeral 18 and this rearward extension 18 also terminates in a rear panel 20 which is disposed in spaced parallel relation to the front panel 12 and generally is in the same plane as the rear panels 16. It is noted that the rear panels 16 as well as the edges 14 do not extend throughout the length of the front panel 12 thus permitting the rear panel 20 to be disposed in the same plane as the rear panels 16, the rear panel 20 being relatively short in width. The front panel 12 also extends beyond the edges of the rear panels 16 remote from the rear panel 20 whereby the front panel 12 will generally form a guide for assisting in the insertion of a folded answer sheet generally designated by the numeral 22. The folded answer sheet will be completely inserted under the front panel 12 and will engage the side edge 18 for limiting the insertion thereof and positively aligning the folded answer sheet 22 in relation to the front panel 12 for a purpose described hereinafter. This guide 10 is preferably constructed of plastic although it could be constructed of sheet metal, cardboard, wood or any suitable sheet material.

The front surface of the front panel 12 is provided with a plurality of vertical or longitudinal division lines 24 and a plurality of horizontal or transverse divisional lines 26 dividing the front surface of the panel 12 into a plurality of areas 28 some of which are of one size and some of which may be of other sizes. Disposed on each area 28 is printed material or indicia 30 designating the category or quality of the handwriting that is being analyzed. For example, the upper left hand area on the front panel 12 may be concerned with whether the handwriting to be analyzed bobs up or down or is straight. This area is provided with two apertures 32 extending through the front panel 12 with indicia 34 being disposed alongside of each aperture, one set of indicia indicating that the letters are nearly straight and the other set of indicia designating that the letters bob up and down. Thus by taking a pencil and marking the answer sheet by inserting the sharpened pencil lead or other suitable marking instrument through one of the apertures 32 the analysis of the handwriting as to this category may be answered with the answer appearing on the answer sheet 22. Other categories may be provided on each of the areas 28 having a multiplicity of apertures 32 arranged in vertical alignment with each other in each of the areas 28 although the openings in one area may be out of alignment with the openings in the other areas. Each of the openings permits an answer to be provided on the underlying answer sheet 22. The upper right hand corner of the panel 12 may be provided with inclined angularly disposed lines 36 for gauging the slope of letters and horizontally inclined lines 38 for gauging the slope of lines, each different classification being provided with an opening 32.

Alongside the right edge of the guide is a plurality of notches 40 in the front panel 12 which are of progressively diminishing width, these notches being used to gauge the size of small letters and each notch 40 being provided with an opening 32 for permitting the proper answer to be designated on the folded answer sheet.

The folded answer sheet 22 is in the form of a square or rectangular sheet of paper 42 having the upper left hand corner thereof provided with areas 44 corresponding to the areas 28 on the panel 12 and provided with circular rings 46 thereon for underlying the openings 32. Each area 44 is provided with designating letter indicia 48 and each circular area 46 is also provided with designating indicia. For instance, the section 44 underlying the upper left hand section of the panel concerning the formation of letters may be designated generally with an A, the two circular areas being defined by A1 and A2 respectively. The other categories or sections may be correspondingly designated by letters of the alphabet. Disposed on the remainder of the sheet of material 42 are other answers or combinations of answers whereby various combinations of answers that are provided on the answer sheet may be compared with the characteristics of the person during the handwriting thus being revealed. As an example, if the upper circle 46 in the section 44 was marked to indicate that the letters were nearly straight, then the answer would be A1 and if A1 could be combined with answer N2 which would be another category as to the size of small letters which section is designated by number 11 in the lower right hand corner thereof, this indicia being provided in each section 28 and being designated by the reference numeral 44. Thus, if the letters are all nearly straight and the letters are open then one of the characteristics of the person involved would be honesty. Thus by going through the various combinations set forth in the various categories on the answer sheet, the characteristics of the person that supplies the handwriting may be determined.

With the present device, handwriting analysis may be employed as a game which would be highly entertaining since the various participants could have their handwriting analyzed. Additionally, the device may be employed in various places such as personnel offices or wherever it is desired to determine the characteristics of persons in which a sample of their handwriting is available. The various information and answers are based upon research and statistics and provide an easy guide for analyzing handwriting without requiring a longer period of study to become skilled in the analysis of handwriting.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A guide for analyzing a sample of handwriting, comprising a substantially rectangular rigid panel, means provided at three side edges of said panel for holding an answer sheet in underlying relation thereto, the fourth side edge of said panel provided with a row of spaced notches of different widths for gauging the size of letters in a handwriting sample, intersecting lines marked on said panel and dividing the area thereof into a plurality of sections, each section of the panel being provided with a set of apertures through which qualitatively classified answers may be marked on an underlying answer sheet, and qualitative indicia marked on each section of said panel adjacent the apertures therein for classifying the same from the other sections.

2. A guide for analyzing a sample of handwriting, comprising a substantially rectangular rigid panel, means provided at three side edges of said panel for holding an answer sheet in underlying relation thereto, intersecting lines marked on said panel and dividing the area thereof into a plurality of sections, each section of the panel being provided with a set of apertures through which qualitatively classified answers may be marked on an underlying answer sheet, inclined lines marked on one section of said panel adjacent the apertures therein for gauging the slope of letters and of lines of letters in a handwriting sample, and qualitative indicia marked on each section of said panel adjacent the apertures therein for classifying the same from the other sections.

3. A guide for analyzing a sample of handwriting, comprising a substantially rectangular rigid panel, means provided at three side edges of said panel for holding an answer sheet in underlying relation thereto, intersecting lines marked on said panel and dividing the area thereof into a plurality of sections, each section of the panel being provided with a set of apertures through which qualitatively classified answers may be marked on an underlying answer sheet, qualitative indicia marked on each section of said panel adjacent the apertures therein for classifying the same from the other sections, an answer sheet held under said panel by said means at three side edges of the panel, circular areas marked on said answer sheet in register with the apertures in said panel, and indicia marked on the answer sheet adjacent said circular areas for interpreting the qualitatively classified answers marked through said apertures, said last-mentioned indicia being concealed under said panel when said answer sheet is in position thereunder.

References Cited in the file of this patent

UNITED STATES PATENTS

| | | |
|---|---|---|
| 1,842,470 | Brownlee | Jan. 26, 1932 |
| 2,503,130 | Poritz | Apr. 4, 1950 |
| 2,551,083 | Angell et al. | May 1, 1951 |
| 2,730,817 | Blattner | Jan. 17, 1956 |